United States Patent
Milliorn

(10) Patent No.: US 6,543,642 B1
(45) Date of Patent: Apr. 8, 2003

(54) DISPOSABLE GLOVE DISPENSER SYSTEM

(75) Inventor: J. Michael Milliorn, Fort Worth, TX (US)

(73) Assignee: Daydots International, Inc., Fort Worth, TX (US)

( * ) Notice: Subject to any disclaimer, the term of this patent is extended or adjusted under 35 U.S.C. 154(b) by 29 days.

(21) Appl. No.: 09/957,783

(22) Filed: Sep. 21, 2001

(51) Int. Cl.[7] .............................................. B65D 75/26
(52) U.S. Cl. ............................ 221/46; 221/49; 221/63; 206/438; 206/494
(58) Field of Search .............................. 221/33, 45, 46, 221/63, 48, 49, 65; 206/494, 438

(56) References Cited

U.S. PATENT DOCUMENTS

| | | | |
|---|---|---|---|
| 3,746,152 A | * 7/1973 | Allen | 206/277 |
| 3,870,150 A | * 3/1975 | Hummel | 206/438 |
| 4,790,436 A | * 12/1988 | Nakamura | 206/449 |
| 4,844,293 A | * 7/1989 | McLaughlin | 221/34 |
| 4,896,773 A | * 1/1990 | Zilio | 206/494 |
| 4,993,589 A | * 2/1991 | McLaughlin | 221/33 |
| 5,088,620 A | 2/1992 | Kelliher et al. | |
| 5,096,089 A | * 3/1992 | McLaughlin | 221/26 |
| 5,145,091 A | * 9/1992 | Meyers | 221/45 |
| 5,462,197 A | * 10/1995 | Pound | 221/46 |
| 5,542,567 A | * 8/1996 | Julius | 221/63 |
| D387,981 S | 12/1997 | Mosior et al. | |
| 5,878,909 A | 3/1999 | Rogow | |
| 5,921,434 A | 7/1999 | Hollander et al. | |
| 5,996,797 A | * 12/1999 | Flaig | 206/494 |
| 6,021,919 A | * 2/2000 | Kelly | 221/25 |
| 6,364,156 B1 | * 4/2002 | Smith et al. | 221/46 |

* cited by examiner

Primary Examiner—Patrick H. Mackey
(74) Attorney, Agent, or Firm—Fulbright & Jaworski L.L.P.

(57) ABSTRACT

The present invention is directed to a glove dispenser system that includes a reusable container and a disposable pouch containing stacked, partially folded gloves. The container is rigid and generally rectangular and has a lid and a bottom, spaced, parallel front and back walls, two spaced, parallel side walls and an opening in the lid. The pouch is generally rectangular shaped and it has a pair of spaced parallel extending faces yieldably connected to one another. One of the faces has an opening aligned with the opening in the lid of the container. The pouch contains a plurality of gloves in a stacked folded relationship with one another. The folded relationship being formed by a thumb of the glove being folded under a palm area of the glove and fingers of the glove being folded over the thumb and the palm area. The configuration of the pouch opening and the folded relationship of the gloves provides for the removal of one of the plurality of glove at a time during a dispensing procedure.

13 Claims, 5 Drawing Sheets

DISPOSABLE GLOVE DISPENSER SYSTEM

BACKGROUND OF THE INVENTION

1. Field of the Invention

The present invention relates to a dispenser for disposable sanitary gloves in general and more particularly to a system of pouches of disposable sanitary gloves and a reusable dispenser for the pouches for use in sanitary environments.

2. Description of the Prior Art

The use of disposable gloves is widespread and diverse. Many professional occupations, including ambulance, fire, police, medical, dental, laboratory personnel, food handlers and many others, use such disposable gloves for a wide variety of uses and applications. A major limitation to expanding the use and availability of such gloves is found in the manner in which they have been packaged for use and distribution to the ultimate consumer.

The prior art glove dispensers consist basically of familiar, expected and obvious structural configurations, notwithstanding the numerous designs encompassed by the prior art. Given the intended disposable nature of the gloves and the necessity of maintaining a low cost per glove, a majority of the current means for packaging a plurality of gloves in a unit for dispensing consists of a plurality of gloves in a stacked, rolled or folded relationship contained within a paperboard box. In this kind of packaging it is very difficult to consistently retrieve only one glove at a time and too often a user pulls a plurality of gloves out of the box resulting in discarding all but the one required. Another packaging means for such gloves has comprised a roll of tissue paper carrying a single glove mounted on the paper roll in spaced relationship from one another along the length of the roll. This is not satisfactory because it is too costly for many applications or potential applications in which such gloves might otherwise be made available for use. Further, both of these packaging methods are deficient in providing protection of the packaged gloves against the elements of water or moisture.

Other prior art examples include U.S. Pat. No. 4,844,293 to Mclaughlin that describes a dispensing apparatus for disposable, thin plastic gloves that consists of a box like, rectangular type enclosure for housing a removably mounted packet containing a plurality of gloves. The dispenser contains a front window and a removable top cover or cap. The gloves are biasly urged toward the front window of the dispenser using a leaf spring arrangement to present the outermost glove to the user. U.S. Pat. No. 5,088,620 to Kellihur et al discloses a dispenser for gloves consisting of a tubular body having a first end and a second end and having a spring disposed therein. A top element slidably fits over the top of the tubular body and has an opening therein and a disc element including an aperture. The spring urges the disc member against a nipple shaped member containing the gloves, allowing for removal of one glove at a time from the device. U.S. Pat. No. 5,096,089 to McLaughlin describes a dispensing device for thin, disposable plastic gloves that consists of a rectangular shaped enclosure for housing a removably mounted packet containing a plurality of gloves. The gloves are arranged in closely spaced, parallel relationship to one another for removal one at a time through an opening in the walls of the enclosure. The packet of gloves includes a mounting strip which extends across the upper wrist portion of the stack of gloves and is fixed to each glove above the tear line. Each glove is removed by exerting a downward force through the opening of the enclosure. Other prior art patents include U.S. Pat. No. 5,878,909 to Rogow; U.S. Pat. No. 5,921,434 to Hollander et al. and U.S. Pat. No. 6,021,919 to Kelly.

It would be desirable to provide a convenient and disposable glove dispensing system that provides efficient one at a time retrieval of the gloves in a low cost manner and further provides a low cost reusable protected dispenser that encourages the use of the gloves in applications requiring sanitary gloves.

BRIEF SUMMARY OF THE INVENTION

The present invention is directed to a glove dispenser system that includes a container and a pouch containing stacked, partially folded gloves. The container is rigid and generally rectangular and has a lid and a bottom, two spaced, parallel front and back walls, two spaced, parallel side walls and an opening in the lid. The lid provides interior access to the container. The pouch is generally rectangular shaped and it has a pair of spaced parallel extending faces yieldably connected to one another. The faces have a planar configuration for encompassing the planar area of a partially folded disposable glove. One of the faces has an opening aligned with the opening in the lid of the container.

The pouch contains a plurality of gloves placed between the pouch faces in which the gloves are in a stacked folded relationship with one another. The folded relationship being formed by a thumb of the glove being folded under a palm area of the glove and fingers of the glove being folded over the thumb and the palm area. The configuration of the pouch opening and the folded relationship of the gloves provides for the removal of one of the plurality of gloves at a time during a dispensing procedure.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

The present invention is directed to a disposable glove dispenser system 10 that includes an outer rigid reusable container 12 and a disposable pouch 14 containing a plurality of disposable gloves 16, removably mounted within the container 12. Container 12 is preferably made from a conventional plastic material that can be easily manufactured in a relatively inexpensive manner using standard molding techniques such as thermoforming. For example, container 12 can be formed from 20 gauge polystyrene or any other heat formable material such as polyvinyl chloride or polyethylene.

Figure 1:
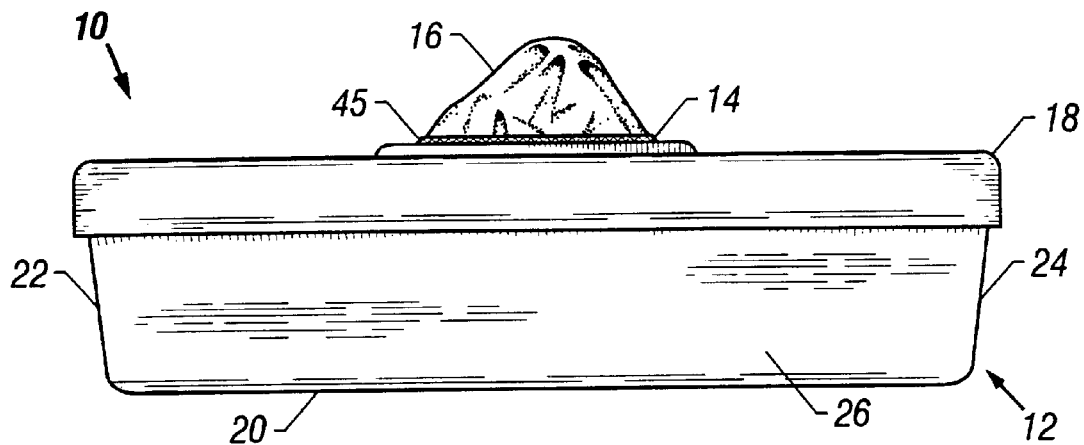
FIG. 1 is a front plan view of the glove dispenser of the present invention.
Figure 2:
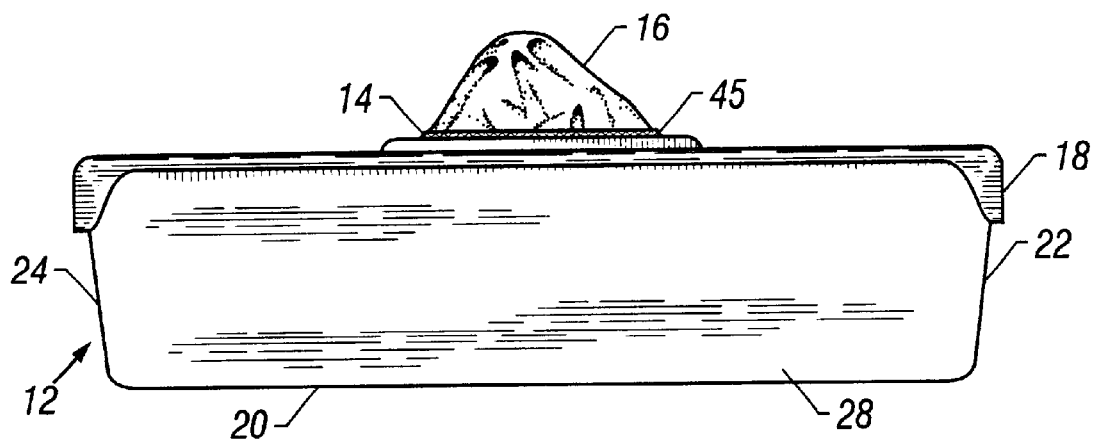
FIG. 2 is a back plan view of the glove dispenser of FIG. 1.
Figure 3:
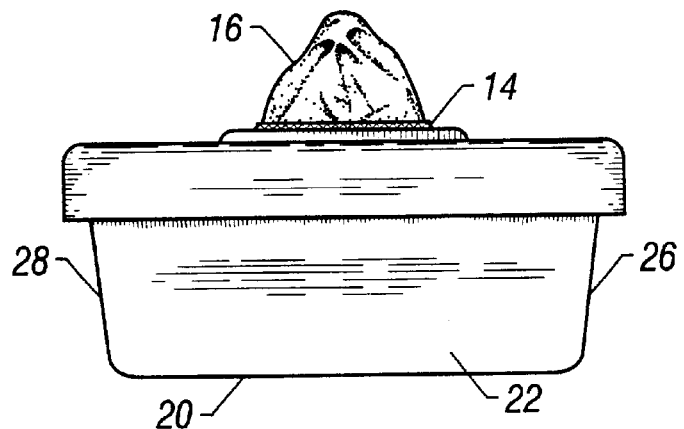
FIG. 3 is a side plan view of the glove dispenser of FIG. 1.
Figure 4:
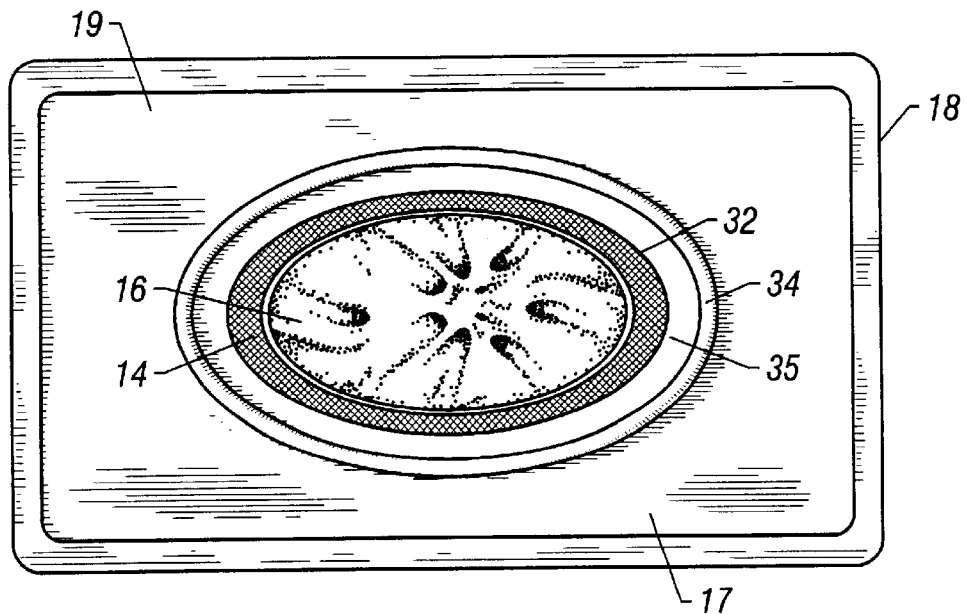
FIG. 4 is a top plan view of the glove dispenser of FIG. 1.
Figure 5:
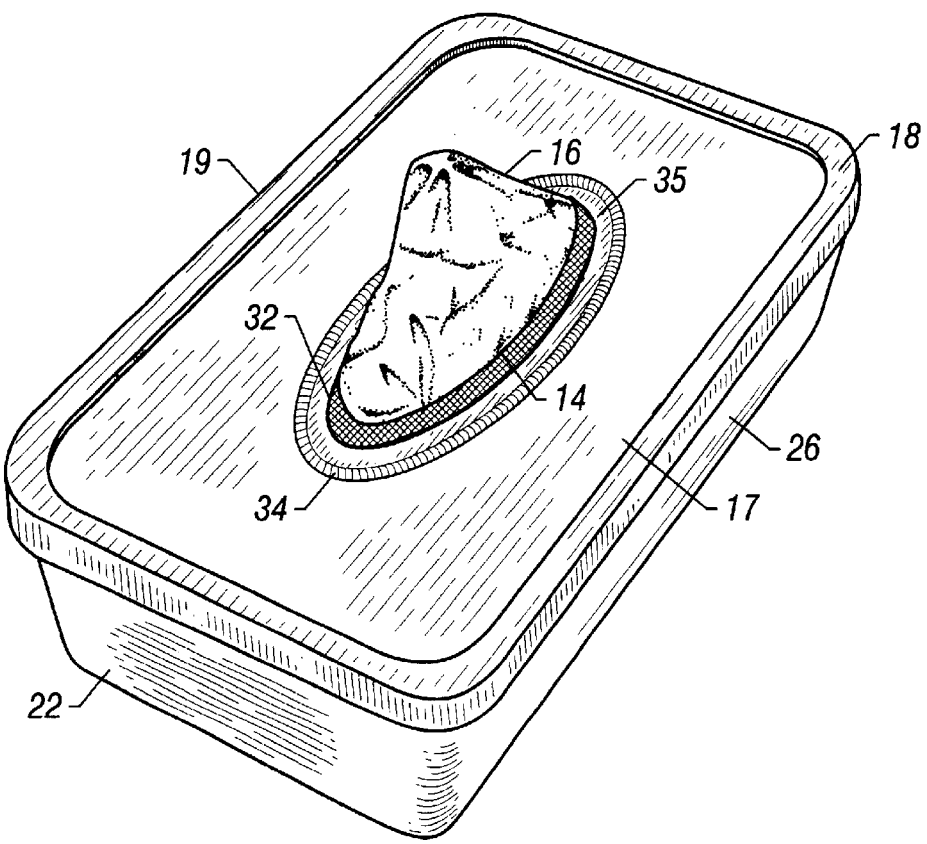
FIG. 5 is a perspective view of the glove dispenser of the present invention.
Figure 6:
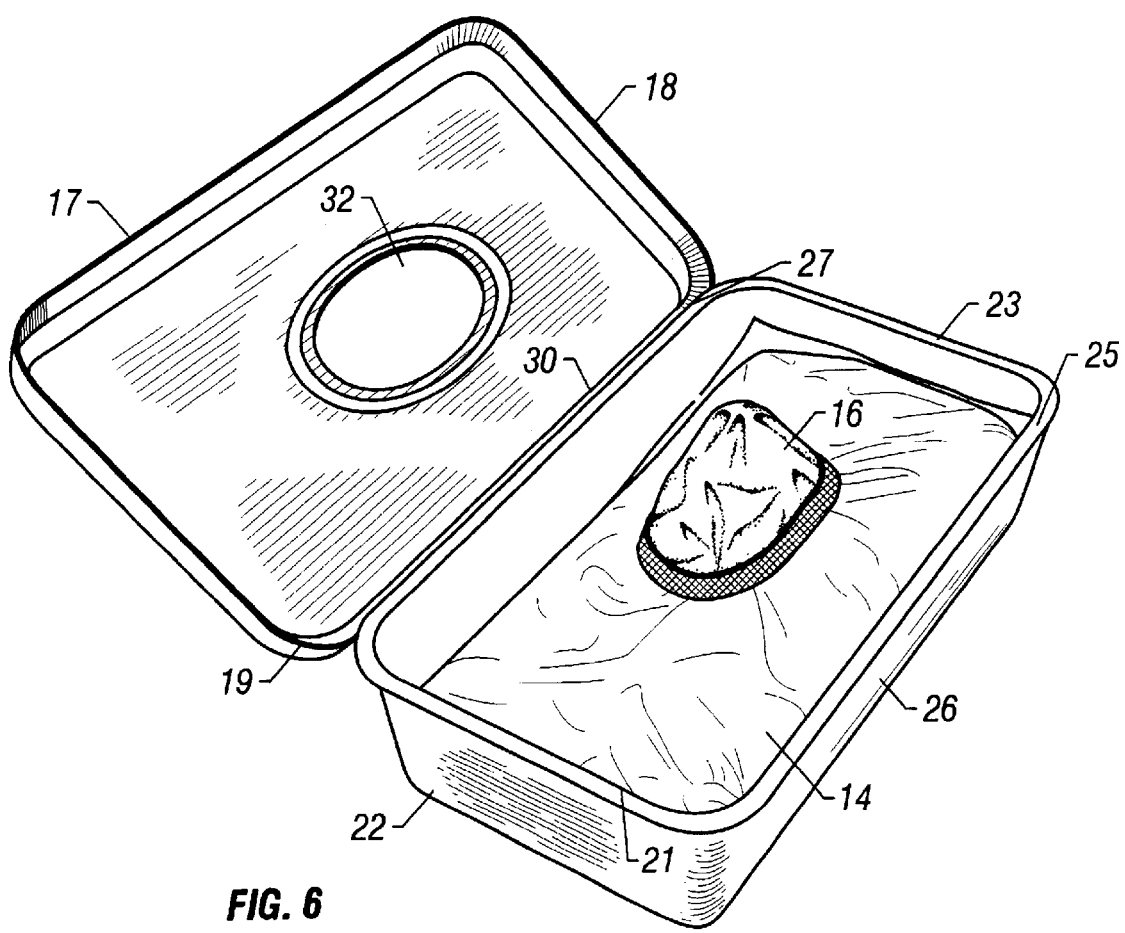
FIG. 6 is a perspective view of the glove dispenser of the present invention in an open position.

Container 12 is a rectangular enclosure having a lid 18, a bottom 20, left and right side walls 22, 24 respectively, a front wall 26 and a back wall 28 (FIGS. 1–5). Lid 18 has a front portion 17 and a back portion 19. The back portion 19 of lid 18 is pivotally attached along the top portion 27 of back wall 28 with a flexible hinge 30 formed in the thermoforming process (FIG. 6). Lid 18 includes a centrally positioned oval opening 32 from which the disposable gloves 16, contained within the pouch 14, are withdrawn (FIGS. 4–6). In a preferred embodiment, the dimension of the oval opening 32 can be generally 5×2.75 inches. Preferably, the height of side walls 22, 24 can be generally about 1.37 inches, the width of the container 12 can be generally 5.12 inches, and the length can be generally 9.25 inches for the bottom portion of the container 12 and 9.88 inches for the lid 18. The lid 18 can have a depth of about 0.25 inches. Container 12 is closed by snapping the lid 18 over the top portions 21, 23 of side walls 22, 24 and the top portion 25 of the container front wall 26. In a preferred embodiment, the oval opening 32 in lid 18 is surrounded by a ridge 34 having generally sloped sides and a rounded top. Ridge 34 is positioned a small distance in from the opening 32, creating a flat lip section 35 between ridge 34 and opening 32. The inside dimension (length and width) of the ridge 34 can be generally 5¾×3⅜ inches and the inside dimension of the lip section 35 can be generally 5⁵⁄₁₆×3 inches. The ridge 34 and lip section 35 provide strength to the lid 18.

Figure 7:
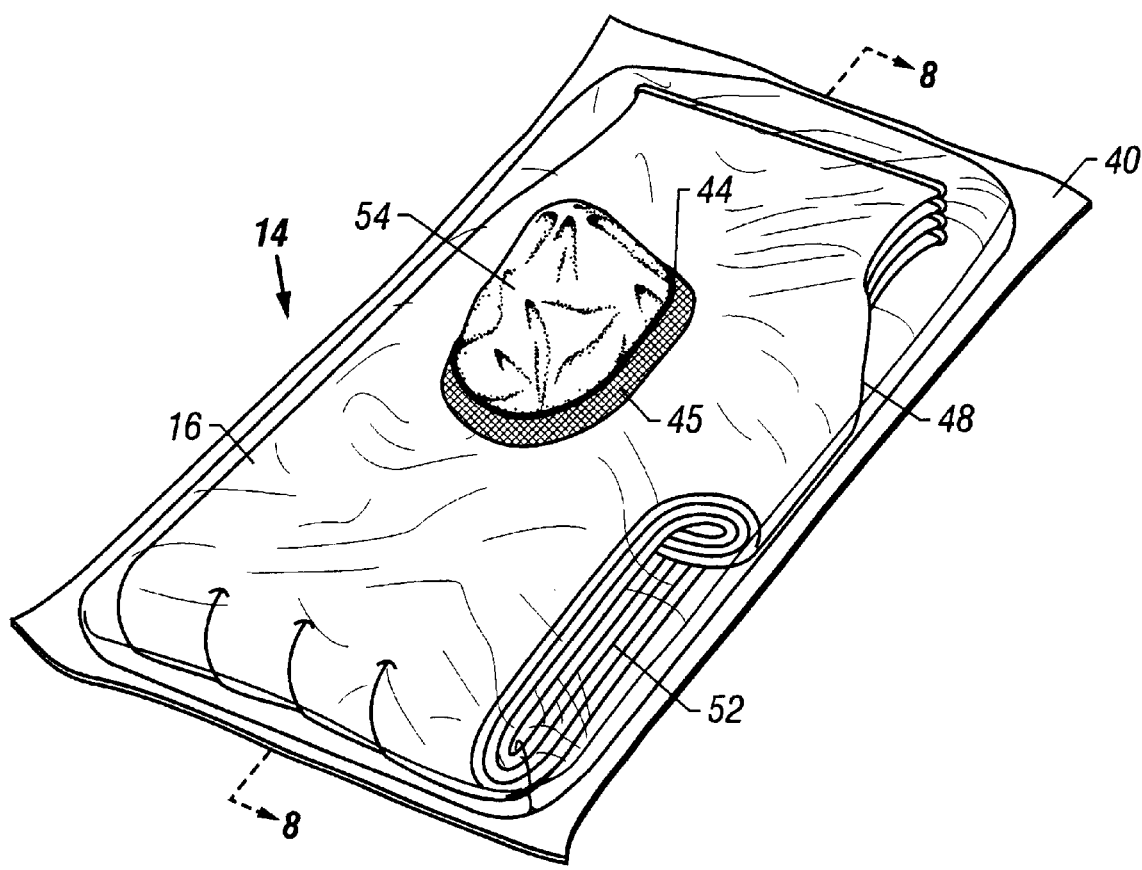
FIG. 7 is a perspective view of a pouch of disposable gloves of the present invention.
Figure 8:
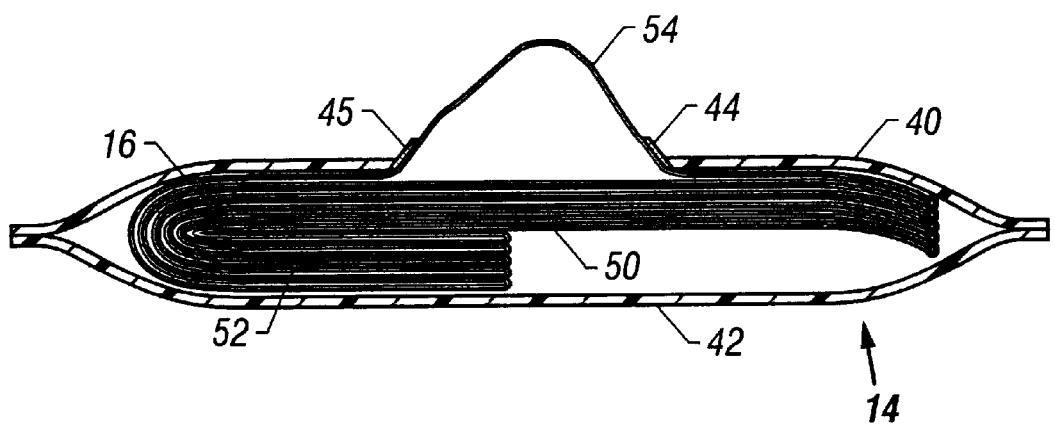
FIG. 8 is a side view in cross section of the pouch of FIG. 7, the cross section being taken along lines 8—8.
Figure 9:
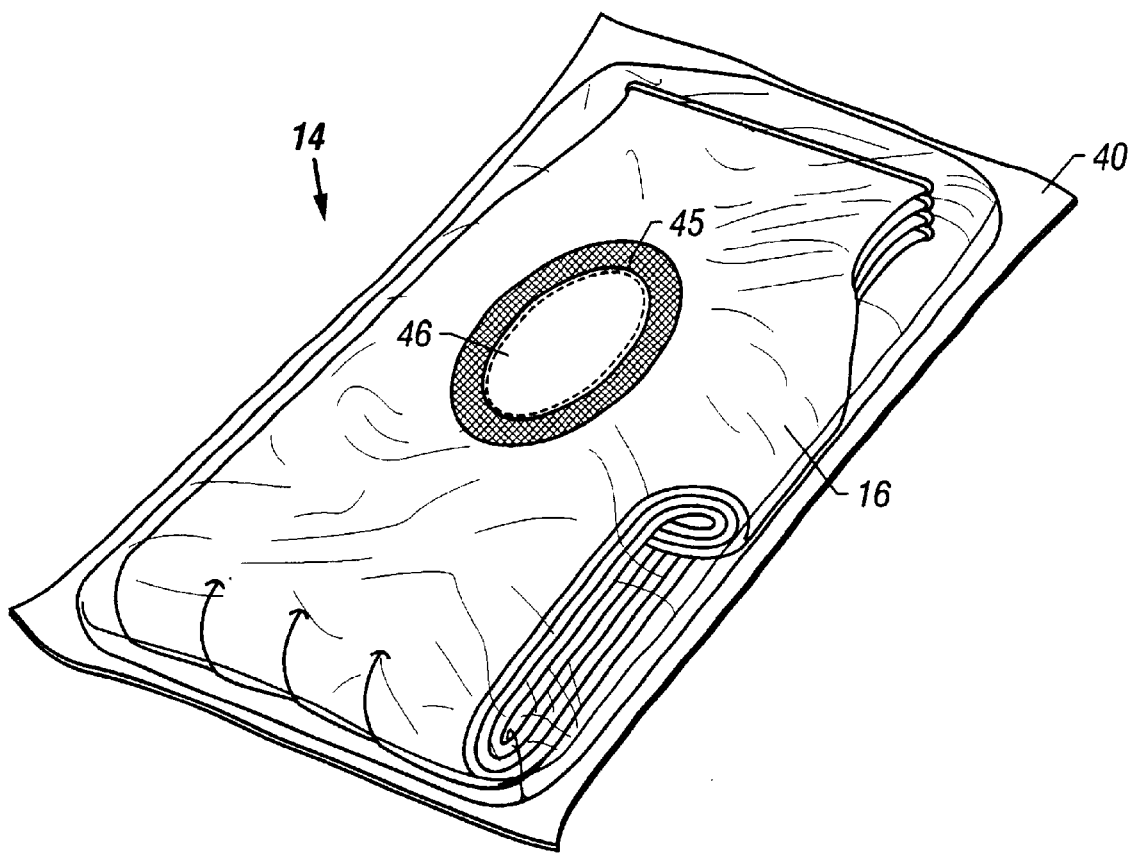
FIG. 9 is a perspective view of an unopened pouch of disposable gloves of the present invention.

Pouch 14 is generally rectangular in shape and has a front face 40 and a rear face 42 which are yieldably connected to one another along all four side edges of pouch 14. The faces 40, 42 are in a spaced, parallel and extending relationship to one another and have a planar configuration for encompassing the planar area of a partially folded disposable glove. Pouch 14 includes a centrally located oval opening 44, similar in size and shape to the oval opening 32 of lid 18 (FIGS. 7 and 8). Opening 44 can be formed to include a perforated center section 46 configured to permit the user to easily tear away the center section 46 to create the opening 44 prior to placing the pouch 14 into container 12 (FIG. 9).

Preferable opening 44 includes a surrounding band 45 that can be color coded to indicate the size of the gloves 16 in the pouch 14. In one embodiment, pouch 14 is generally about 9×5 inches before it is filled with gloves 16 and oval opening 44 is generally about 4×1.75 inches. Pouch 14 can be formed from low density polyethylene, polypropylene or other similar material. The disposable pouch 14 is formed and filled as is known to one skilled in the art of making disposable glove dispensers.

Disposable gloves 16 can be formed from a thin polyethylene or vinyl material as is known to one skilled in the art. In a preferred embodiment, pouch 14 will contain either 100 stacked polyethylene gloves or 34 stacked vinyl gloves. Gloves 16 are nested inside each other so that an entire stack of gloves 16 (100 or 34) is folded at once. The stacks of gloves 16 are folded into a flattened fist position in which the thumb 48 of the glove is folded under the palm portion 50 and the fingers 52 are folded over the thumb 48 and palm portion 50 of the glove 16 (FIGS. 7 and 8). The stacked and partially folded gloves 16 are placed in pouches 14 so that the back hand portion 54 of gloves 16 is positioned below the oval opening 44 of the pouch 14. A user removes the gloves 16 from the pouch 14 by grasping the back hand portion 54 of the glove 16, which extends through opening 44, with the user's index finger and thumb. One glove at a time is dispensed through opening 44 of pouch 14 and opening 32 of container 12. The shape of the pouch's oval opening 44 in conjunction with the inventive folding technique of the stacked gloves 16, provide enough friction between the stacked gloves 16 to facilitate the removal of only one glove at a time during dispensing. Pouches 14 can be filled with small, medium or large sized gloves 16.

To use the disposable glove dispenser system 10 of the present invention, the user opens lid 18 and places a pouch 14, containing a stack of gloves 16, into the container 12 (FIG. 6). If the pouch opening 44 includes a perforated center section 46, it can be removed either prior to or after closing lid 18. After container lid 18 is closed, oval opening 44 of pouch 14 is aligned with oval opening 32 of lid 18 and the dispenser system 10 is ready to use (FIGS. 1–5). When lid 18 is closed, band 45, surrounding oval opening 44 of pouch 14, extends up through opening 32 of the lid 18. The color coding on band 45 will indicate to the user the size of the gloves 16 in the container 12. When all of the stacked gloves 16 in pouch 14 have been dispensed, the empty pouch 14 is removed and a new pouch 14 of stacked gloves 16 is inserted into container 12. The inventive glove dispenser system 10 promotes efficient "one at a time" removal of thin disposable gloves. The permanent, re-usable container 12 in cooperation with the pouches 14, provides a means for easily dispensing gloves in an improved container in order to promote the use of disposable gloves in conditions containing water or moisture such as those found in medical, dental and laboratory environments and in the food services industries.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A glove dispenser system comprising:
   a) a generally rectangular-shaped, rigid reusable container having a lid and a bottom, spaced, parallel front and back walls, two spaced, parallel side walls and an opening in the lid, the lid providing interior access to the container;
   b) a generally rectangular-shaped disposable pouch having a pair of spaced parallel extending faces yieldably connected to one another, the faces having a planar configuration for encompassing the planar area of a partially folded disposable glove, one of the faces having an opening aligned with the opening in the lid of the container;
   c) a plurality of gloves placed in the pouch between the faces, the gloves being in a stacked folded relationship with one another, the folded relationship being formed by a thumb of the glove being folded under a palm area of the glove and fingers of the glove being folded over the thumb and the palm area; and
   d) the configuration of the pouch opening and the folded relationship of the gloves providing for the removal of one of the plurality of gloves at a time during a dispensing procedure.

2. The glove dispenser system of claim 1, wherein the opening in the lid and the opening of the pouch is oval in shape.

3. The glove dispenser system of claim 1, wherein the lid is attached to the back wall by a flexible hinge.

4. The glove dispenser system of claim 1, wherein the container is formed by a thermoforming process.

5. The glove dispenser system of claim 1, wherein the container is formed from a polystyrene material.

6. The glove dispense system of claim 1, wherein the pouch faces are connected to one another along each side.

7. The glove dispenser system of claim 1, wherein the pouch opening includes a perforated center section configured for removal from the opening.

8. The glove dispenser system of claim 1, wherein the pouch is formed from a low density polyethylene material.

9. The glove dispenser system of claim 1, wherein the plurality of stacked and partially folded gloves contained within the pouch consists of 100 stacked and partially folded polyethylene gloves.

10. The glove dispenser system of claim 1, wherein the plurality of stacked and partially folded gloves contained within the pouch consists of 34 stacked and partially folded vinyl gloves.

11. The glove dispenser system of claim 1, wherein the plurality of gloves are formed from polyethylene or vinyl material.

12. The glove dispenser system of claim 1, wherein the plurality of gloves in a pouch are of a size selected from the group consisting of small, medium and large.

13. The glove dispenser system of claim 1, wherein the lid provides access to the interior of the container so that after the plurality of gloves have been dispensed from a pouch, the empty pouch can be replaced with a new pouch containing a plurality of gloves.

* * * * *